United States Patent [19]
Cowger

[11] Patent Number: 5,852,946
[45] Date of Patent: Dec. 29, 1998

[54] METHOD AND APPARATUS FOR DETECTING FLUID LEVEL

[75] Inventor: Bruce Cowger, Corvallis, Oreg.

[73] Assignee: Hewlett-Packard Company, Palo Alto, Calif.

[21] Appl. No.: 698,719

[22] Filed: Aug. 15, 1996

[51] Int. Cl.⁶ .......................... G01F 23/292; B41F 31/02
[52] U.S. Cl. .............................. 73/293; 222/64; 250/900; 347/7
[58] Field of Search .............................. 73/293; 250/900, 250/577; 222/64; 347/7, 87

[56] References Cited

U.S. PATENT DOCUMENTS

| | | | |
|---|---|---|---|
| 2,190,027 | 2/1940 | Jordan | 116/227 |
| 3,448,616 | 6/1969 | Wostl et al. | 73/293 |
| 4,038,650 | 7/1977 | Evans et al. | 340/619 |
| 4,342,042 | 7/1982 | Cruz-Uribe et al. | 347/7 |
| 4,443,699 | 4/1984 | Keller | 250/227.11 |
| 4,544,840 | 10/1985 | Keller | 250/227.23 |
| 4,732,035 | 3/1988 | Lagergren et al. | 73/293 |
| 4,783,599 | 11/1988 | Borden | 250/574 |
| 4,938,590 | 7/1990 | Ishida | 73/293 |
| 4,973,993 | 11/1990 | Allen | 347/87 |
| 5,054,319 | 10/1991 | Fling | 73/293 |
| 5,164,605 | 11/1992 | Kidwell | 73/293 |
| 5,406,315 | 4/1995 | Allen et al. | 347/7 |

*Primary Examiner*—George M. Dombroske
*Assistant Examiner*—Harshad Patel
*Attorney, Agent, or Firm*—Kevin B. Sullivan

[57] ABSTRACT

The present invention is a fluid level detector for providing a signal indicative of fluid level in a fluid container. The fluid level detector includes a first light conduit portion for providing light to fluid within the fluid container and a second light conduit portion for receiving light provided by the first light conduit portion. A light path extends from the first light conduit portion into the second light conduit portion. The light path has a light path length that varies with fluid level within the fluid container. The light path length variation produces light intensity variation at the second conduit portion which is indicative of fluid level in the fluid container.

23 Claims, 2 Drawing Sheets

METHOD AND APPARATUS FOR DETECTING FLUID LEVEL

BACKGROUND OF THE INVENTION

The present invention is a fluid level detector for identifying fluid level in a flexible container having a shape that varies with the amount of fluid in the container. More specifically, the present invention is a fluid level detector for detecting changes in a light path length through fluid produced by varying amounts of fluid in the container.

Ink jet printers are well known. One common type of ink jet printer uses a replaceable print cartridge which contains a printhead and a supply of ink contained within the print cartridge. This type of print cartridge is not intended to be refillable. When the initial supply of ink is depleted, the print cartridge is disposed of and a new print cartridge is installed within the scanning cartridge. Frequent replacement of the print cartridge results in a relatively high operating cost.

One attempt to reduce the operating cost has been to provide an external, stationary ink reservoir connected to the scanning print cartridge via a tube. Because the ink container is not mounted on the scanning cartridge the ink container can be made to accommodate larger volumes of ink than typical cartridge mounted to the scanning printhead. In addition, the use of a replaceable ink container allows for the replacement of the ink container separate from the printhead, thereby reducing the operating cost of the printer.

Increased operating costs can also result from running out of ink before an output image is completed. When any one of the ink colors are exhausted before the output image is completed the entire image must be reprinted. The ink used for the incomplete image as well as media used for the incomplete image is wasted, increasing operating costs. Particularly in the case of large format printing where the print media tends to be large and typically expensive and the amount of ink required to form large images is relatively large. Therefore, it is important to detect low ink conditions so that the user does not start printing an image when there is insufficient ink to complete the image. In addition, identifying a low ink condition allows the user to obtain another ink cartridge before the ink container currently being used is completely out of ink thereby allowing uninterrupted printing.

There is an ever present need for printers having low operating costs. These printers should make use of some technique for determining the occurrence of a low ink condition in the ink container. This technique should be reliable, readily manufacturable, and be relatively inexpensive.

SUMMARY OF THE INVENTION

The present invention is a fluid level detector for providing a signal indicative of fluid level in a fluid container. The fluid level detector includes a first light conduit portion for providing light to fluid within the fluid container. A second light conduit portion is provided for receiving light provided by the first light conduit portion. Also included is a light path extending from the first light conduit portion to the second conduit portion. The light path has a light path length associated therewith which varies with an amount of fluid within the fluid container. The light path length variation produces light intensity variation at the second conduit portion which is indicative of fluid level in the fluid container.

In one preferred embodiment, the fluid level detector includes a reflective member for receiving light along an incident light path and directing light along a reflected light path. The reflective member is positioned relative to the first and second conduit portions to receive light from the first conduit portion along the incident light path and direct light along reflected light path toward the second conduit portion. In this preferred embodiment a flexible container is provided for containing fluid. The flexible container has a shape that varies with fluid level within the flexible container. The reflective member is linked to the flexible container to produce changes in the light path length with changes in the flexible container shape Another aspect of the present invention is a fluid level detector which includes a light providing conduit for providing light along a light path. A light receiving conduit is provided for receiving light along the light path. A light path extends from the light providing conduit to the light receiving conduit through fluid. The light path has a first light path length associated with a first ink level and a second light path length associated with a second ink level with the first ink level being different from the second ink level. The first light path length is different from the second light path length. The light receiving conduit produces a first output light signal indicative of the first ink level and a second output light signal, different from the first output signal, indicative of the second ink level.

DETAILED DESCRIPTION OF THE PREFERRED EMBODIMENT

Figure 1:
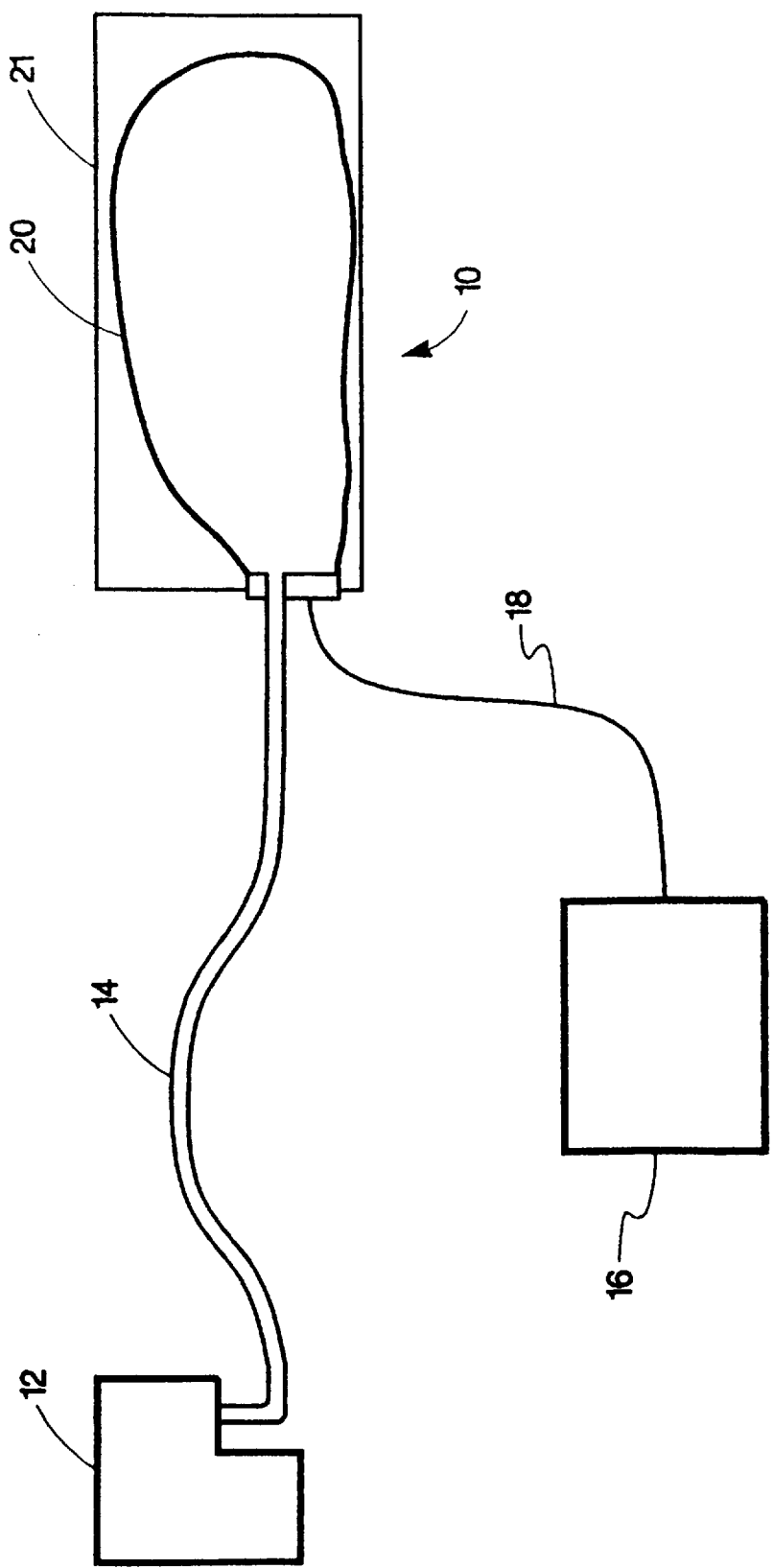
FIG. 1 is a schematic representation of a printing system which includes a printhead, a printer controller and an ink container which includes a fluid level detector of the present invention.

FIG. 1 represents a printing system which utilizes a fluid level detector of the present invention. The printing system includes a fluid container 10, a printhead 12 fluidically connected to the fluid container 10 by a fluidic conduit 14 and a printer controller 16 which is linked to the fluid container 10 by a link 18.

The fluid container 10 provides ink via the conduit 14 to the printhead 12. The printhead 12 is typically mounted in a scanning carriage. By selectively activating the printhead ink is ejected from the printhead to form images on print media. The print controller 16 in conjunction with link 18 and the fluid level detection device of the present invention (shown in FIGS. 2, 3A, 3B, and 4) is used to identify a low ink condition. Upon the occurrence of a low ink condition information is passed between the fluid level detector and the print controller 16 so that appropriate action can be taken, such as, providing some form of notification to the user. It is preferable that the user be notified prior an out of ink condition so that the ink container can be replaced prior to running out of ink or printing an image for which there is insufficient ink to complete.

The link 18 may be an electrical conductor, fiber optic conduit or some conventional means for transferring information between the fluid level detector and the print controller 16. The print controller 16 may be any conventional device such as a microprocessor or programmable controller that either queries the fluid level detector to determine if a low ink condition has occurred or waits until a signal indicative of a low ink condition is received. Once a low ink condition has occurred the print controller 16 provides some form of indicia to the user indicating that a low ink condition has occurred.

In the preferred embodiment the fluid container 10 includes a flexible container 20 for containing fluid and a housing 21 for protecting for the flexible container 20. As fluid, such as ink, in the flexible container 20 is provided to the printhead 12 the flexible container 20 changes shape. The fluid provided to the printhead 12 may be pressurized using some form of biasing means for engaging the flexible container 20 to force fluid out of the flexible container 20 and into the conduit 14. Alternatively, the printhead 12 may produce a negative pressure which draws fluid through the conduit 14 from the flexible container 20.

Figure 2:
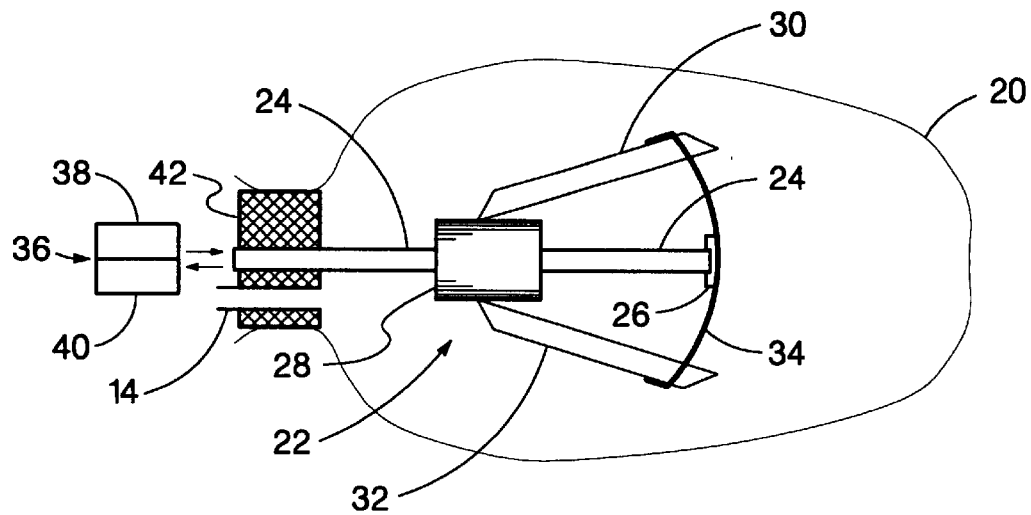
FIG. 2 represents the fluid level detector of the present invention shown within the ink container with the ink container in a full condition.

FIG. 2 represents a schematic illustration of the fluid level detector of 22 of the present invention shown positioned within the flexible container 20. The fluid level detector 22 provides a signal indicative of fluid level which is used by the print controller 16 for identifying a low fluid level condition.

The fluid level detector 22 of the present invention includes a light conduit portion 24 for providing light along a light path through fluid. As fluid is expelled from the flexible container 20 the light path length through this fluid is varied corresponding to the amount of fluid in the flexible container 20. This variation in the light path length produces a corresponding variation in light intensity in the light conduit portion 24 which is indicative of fluid level within the flexible container 20.

In the preferred embodiment the fluid level detector 22 of the present invention includes a light conduit portion 24 for providing light along an incident light path to a reflector 26. Light reflected from the reflector 26 along a reflected light path is received by the light conduit 24. The reflector 26 is positioned by a reflector positioning portion which includes a base 28, a pair of paddles 30 and 32 and a biasing means 34 attached to the reflector 26 and each of the paddles 30 and 32. The reflector positioning portion allows the position of the reflector to vary depending on the amount of fluid in the flexible container 20. Varying the position of the reflector 26 relative to the light conduit 24 varies the light path length through fluid. Because the light path length portion within fluid is varied, light traveling along this light path is attenuated by fluid depending on the length of the light path through the fluid. Therefore, varying the light path length results in a corresponding variation in light intensity along this light path length.

Light is provided to the light conduit 24 by a light emitter/detector 36. The light emitter/detector 36 may be located on the fluid container 10 or within the print controller 16. For the case where the light emitter/detector 36 is located on the print controller 16, the link 18 may be the light conduit 24 which extends all the way to the print controller 16. The light emitter/detector 36 includes a light emitter portion 38 and a light detector portion 40. The light emitter portion 38 provides a light signal or beam to the light conduit 24. This light signal or light beam is transmitted along the light conduit 24 into the fluid container 10 along an incident light path which impinges on the reflector 26. A reflected light beam along a reflected light path emanates from the reflector 26 which impinges the light conduit 24 and is transmitted along the light conduit 24 to the light detector portion 40. The light detector 40 detects light which travels from the light emitter 38 along light conduit 24 to the reflector 26 back along the light conduit 24. It is the portion of the light path between the light conduit 24 and the reflector 26 that extends through fluid. Therefore, variation of the light path length through this fluid portion varies the optical density of the light path thereby varying the light attenuation along the light path based on the amount of fluid in the container. It is the varying light intensity that is detected by the detector 40 that is indicative of a fluid amount in the flexible container 20.

In one preferred embodiment the light conduit 24 is a fiber optic conduit in which the light emitter 38 provides a signal thereto in a conventional manner. In this preferred embodiment the light detector 40 detects a light signal on the light conduit 24 in a conventional manner. The light conduit 24 may be formed of a single fiber or more than one separate fibers.

A fitment 42 is provided for containing ink within the container 20 while allowing ink to flow through conduit 14 to the printhead 12. In addition, the fitment 42 allows light signals or light beams to travel along the light conduit 24 through the fitment 42 thereby allowing the transmission of light in and out of the fluid container 10. The flexible container 20 forms a hermetic seal with the fitment 42. The fitment 42 is attached to the flexible container 20 by an adhesive bond or a weld, some conventional technique for forming a hermetic seal.

Figure 3A:
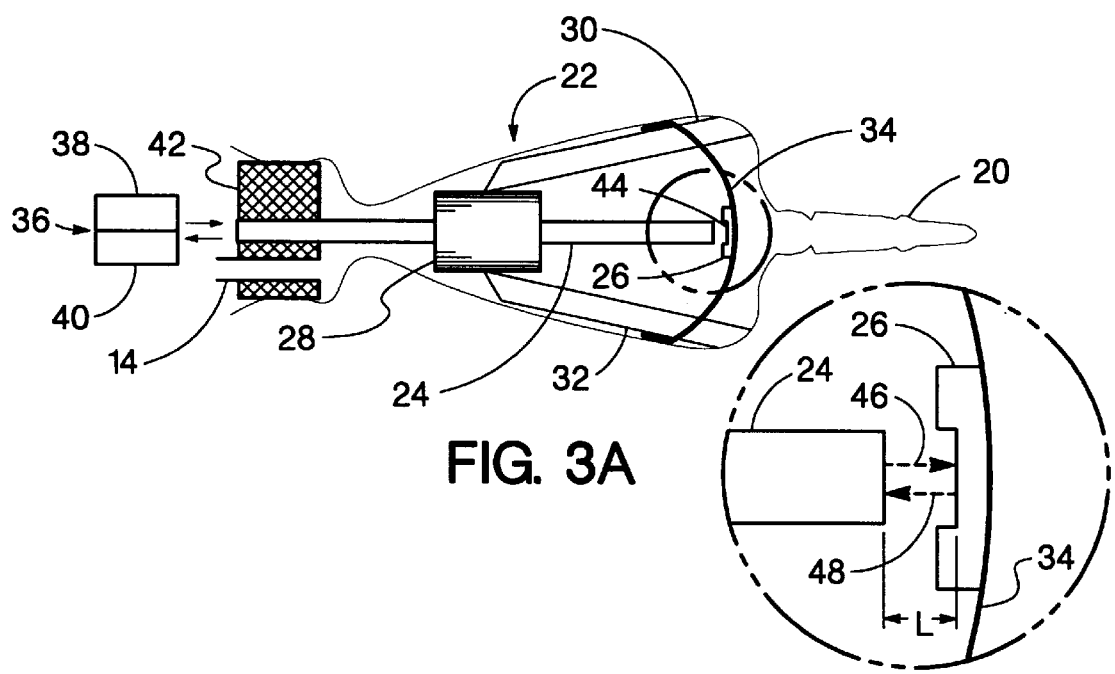
FIGS. 3A and 3B represent the fluid level detector shown in FIG. 2 with the ink container in a low ink condition.
Figure 3B:
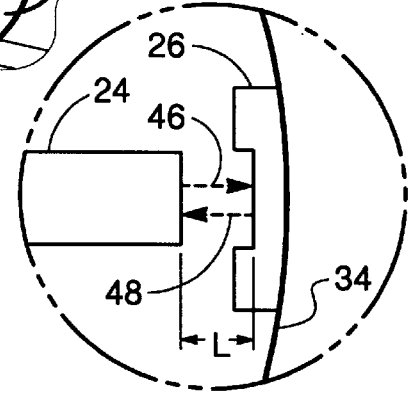
Figure 4:
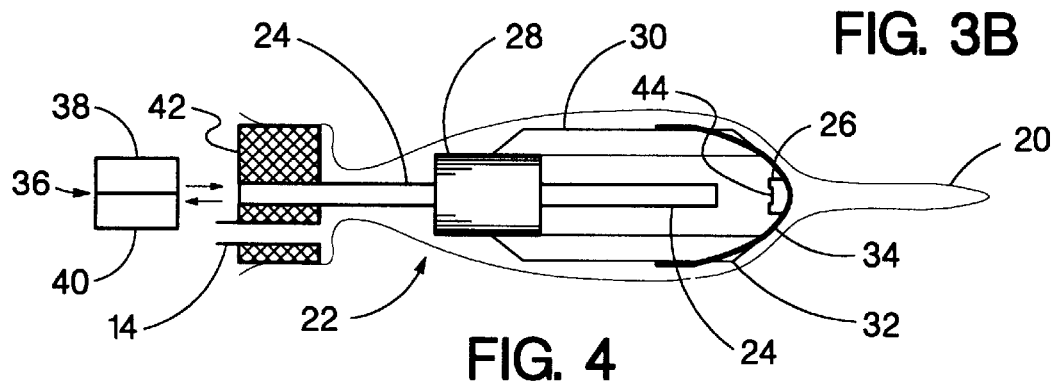
FIG. 4 represents the ink level detector shown in FIG. 2 with the ink container in an ink empty position.

As illustrated in FIG. 2 the flexible container 20 is filled with fluid and contains little or no air. As fluid flows from the flexible container 20 along conduit 14 to the printhead 12 the flexible container 20 collapses as shown in FIGS. 3A and 3B and 4 to displace the fluid lost. It is the collapse of the flexible container 20 which interacts with the reflector positioning device to vary the light path length through fluid. It is this variation in light path length which varies the light intensity thereby indicating fluid amount in the flexible container 20.

The fluid level detector 22 which is the subject of the present invention will now be discussed in more detail. The fluid level detector 22 includes a light conduit 24. A base portion 28 is mounted to have a position which is fixed relative to the light conduit 24. In one preferred embodiment the base member 28 is fastened to the light conduit 24 by press fitting the base 28 onto the conduit 24. Alternatively, the base 28 may be attached to the conduit 24 in a variety of ways such as adhesively bonding or welding the base to the conduit 24. In an alternative embodiment (not shown) the base 28 is attached to or formed as part of the fitment 42.

The paddles 30 and 32 are moveably attached to the base 28 allowing the paddles 30 and 32 to fold inwardly toward each other. The biasing member 34 is connected between paddles 30 and 32 biasing the paddles 30 and 32 outwardly, away from each other. The reflective member 26 is attached to the biasing member 34. The reflective member 26 has a reflective surface 44 which is positioned toward the light conduit 24.

When the flexible container 20 is filled with fluid the paddles 30 and 32 are selected to have a length such that the biasing member 34 biases the paddles 30 and 32 outwardly away from each other. With paddles 30 and 32 extended outwardly the reflective member 26 is positioned proximate the light conduit 24 such that the reflective surface 44 engages or nearly engages the light conduit 24, as shown in FIG. 2.

As the flexible container 20 provides ink to the printhead 12 through the conduit 14 the flexible container 20 collapses on the paddles 30 and 32 urging the paddles inwardly, towards each other. As the paddles 30 and 32 are moved inwardly towards each other the biasing member 34 is deformed or bows in a direction away from the light conduit 24. The movement or deformation of the biasing member 34 away from the light conduit 24 moves the reflective surface 44 from the light conduit 24 separating the light conduit 24 and reflective surface 44, as shown in FIGS. 3A and 3B.

As fluid continues to flow from the flexible container 20, the flexible container 20 collapses upon itself urging paddles 30 and 32 inwardly or toward each other which further moves or deforms the biasing member 34 away from the light conduit 24. As the biasing member 34 is moved away from the light conduit 24 the reflector 26 and the reflective surface 44 is correspondingly moved away from the light conduit 24 as shown in FIG. 4. As the flexible container 20 further collapses the paddles 30 and 32 are moved toward each other moving or deforming the biasing member 34 and further away from the light conduit 24 increasing the separation between the light conduit 24 and the reflective surface 44.

Light provided by the light emitter 38 to the light conduit 24 travels along the light conduit 24 to the reflective surface 44 of reflector 26. This light incident on the reflective surface 44 is reflected back and impinges the light conduit 24 to be detected by the light detector 40, as represented by FIG. 2. Because the reflective surface 44 is in close proximity to the light conduit 24 the light path between the light conduit 24 incident upon the reflective surface 44 and the light path from the reflective surface 44 to the light conduit 24 are very short and these paths extend through little fluid within the flexible container 20. However, as fluid is dispelled from the flexible container 20 the separation between the reflective surface 44 and the light conduit 24 becomes greater. As the separation between the light conduit 24 and the reflective surface 44 increases, the incident and reflected light path between the light conduit 24 and the reflective surface 44 increases.

The separation between the light conduit 24 and the reflective surface 44 for a partially collapsed flexible container 20 is shown in FIG. 3A with the dotted portion shown greatly enlarged for illustrative purposes shown in FIG. 3B. The enlarged portion of FIG. 3A shows the light conduit 24 and the reflector 26 having a reflective surface 44. The reflective surface 44 is separated from the light conduit 24 by a spacing designated as L. An arrow 46 is shown representing an incident light beam provided by the light conduit 24 which impinges on the reflective surface 44. An arrow 48 is shown to represent a reflected light beam from the reflective surface 44 which impinges on the light conduit 24.

It can be seen that as the separation, L, between the light conduit 24 and the reflective surface 44 increases the light path length between the light emitter 38 and the light detector 44 grows by 2 times L. In addition, because this light path in the region between the light conduit 24 and the reflective surface 44 travels through fluid contained within the flexible container 20 the light received by the light detector 40 will be attenuated based on the optical properties of the fluid and the spacing L between the light conduit 24 and the reflective surface 44. Therefore, for a given spacing L between the light conduit 24 and the reflective surface 44, a fluid that has a greater optical density will provide greater attenuation of the light beam provided by light emitter 38 than a fluid that has a lesser optical density. In addition, for a given fluid within the flexible container 20 having a given optical density, the greater the spacing L between the optical conduit 24 and the reflective surface 44, the greater the attenuation of the light signal provided by light emitter 38 which is detected by the light detector 44.

By properly selecting the lengths of the paddles 30 and 32 and locations where the paddles 30 and 32 are attached to the base 28 forming hinge points the fluid level detector 22 provides very accurate trip point detection. Accurate trip point detection is achieved by selecting the paddles 30 and 32 and hinge points such that a large separation L between the light conduit 24 and reflective surface 44 is achieved at the point where a selected amount of fluid is in the flexible container 20. For opaque fluids, such as printing inks, a small amount of separation L between the light conduit 24 and the reflective surface 44 is sufficient to attenuate the reflected light signal received by the detector 40, thereby producing a trip point or low ink condition.

The fluid level detector 22 of the present invention provides a predictable signal that is based on the amount of fluid in the flexible container 20. The fluid level detection is based on the collapse of the flexible container 20 but is relatively insensitive to the particular way the flexible container 20 collapses. Therefore, the flexible container 20 may collapse in several different ways and during each of the different ways of collapse the fluid level detector of the present invention 22 produces a signal at approximately the same fluid amount in the flexible container 20.

The fluid level detector 22 of the present invention may also be used for identifying a range of fluid levels. The paddle lengths and hinge points can be selected such that a range of light level signals can be detected by the light detector 40 over a fluid level range of interest. In this embodiment the light detector 40 is capable of identifying a range of light intensities from full intensity where the reflective surface is pressed against the light conduit 24 to no light signal whereupon the reflective surface is spaced sufficiently from the light conduit 24 that no light is reflected. The light detector output signal 40 then represents the relative amount of fluid within the flexible container 20.

In the preferred embodiment the paddles 30 and 32 are molded together within base 28 to form a living hinge. In this embodiment the paddles 30 and 32 and base portion are made from a high density polyethylene (HDPE). In this preferred embodiment the reflector 26 is made from a compliant pad of silicon or natural rubber (Latex) or ethylene-propylene-diene monomoner (EPDM). The reflector 26 can be bonded to the biasing member or spring 34 using adhesive or the spring 34 can be pierced on either side of the reflector 26 forming ears. These ears can be folded down to affix the reflector 26 to the biasing member 34. The biasing member 34 in this preferred embodiment is selected to be a spring having a natural shape that is straight and is strong enough to keep the paddles 30 and 32 biased open but presents little resistance to being collapsed. For example, the spring in this preferred embodiment is selected so that a negative pressure provided by the printhead 12 is sufficient to collapse the paddles 30 and 32. The spring ends can be attached to the paddles 30 and 32 by using pins or the spring ends which can be inserted through openings within the paddles 30 and 32 and swaged to prevent them from slipping out. This spring is preferably made from ¾ hard stainless steel.

Yet another alternative embodiment the light conduit 24 is formed in two separate light conduits or fiber optic filaments with one filament connected to the light emitter 38 and the other filament connected to the light 40. These two filaments are positioned within the flexible container 20 such that as the flexible container 20 collapses the filaments either are brought together end to end or separated from an end to end position. In this manner ink level can be determined based on a spacing between the end of the light emitting conduit and the end of the light detecting conduit.

The present invention is a relatively low cost method for detecting fluid level. The fluid level detector 22 is easily manufactured and makes use of low cost piece parts. In addition, the fluid level detector 22 of the present invention does not require accurate alignment of the light conduit 24 and light emitter/detector 36 making this detector well suited for use in an ink cartridge which plugs into a printing system. Finally, the present invention provides a fluid level signal that is independent of the particular way the fluid container collapses thereby producing a signal that is a good predictor of the fluid level.

What is claimed is:

1. A fluid level detector for providing a signal indicative of fluid level in a fluid container, the fluid level detector comprising:

a first light conduit portion for providing light to a fluid within the fluid container and a second light conduit portion for receiving light provided by a light source; and a light path extending from the first light conduit portion to the second light conduit portion, through the fluid within the fluid container the light path having a light path length that varies with fluid level within the fluid container, the light path length variation producing light intensity variation at the second light conduit portion which is indicative of fluid level in the fluid container.

2. The fluid level detector of claim 1 further including a flexible container for containing fluid, the flexible container having a container shape that varies with the amount of fluid within the container with changes in the container shape producing changes in the light path length.

3. The fluid level detector of claim 1 further including a reflective member for receiving light along an incident light path and directing light along a reflected light path, the reflective member being positioned relative to the first and second conduit portions to receive light from the first conduit portion along the incident light path and direct light along reflected light path toward the second conduit portion.

4. The fluid level detector of claim 3 wherein the reflective member is positioned within fluid, the reflective member having a first position whereby light detected by the light detector is above a threshold level and a second position whereby light detected by the light detector is below a threshold with the first position being associated with a fluid normal condition and the second position being associated with a fluid low condition.

5. The fluid level detector of claim 3 further including a flexible container for containing fluid, the flexible container having a shape that varies with fluid level within the flexible container and with the reflective member being linked to the flexible container producing changes in the light path length with changes in the flexible container shape.

6. The fluid level detector of claim 1 wherein one of the first and second light conduit portions is a fiber optic conduit.

7. The fluid level detector of claim 1 further including a light source for providing light to the first light conduit portion and a light detector for detecting light intensity received by the second light conduit portion.

8. The fluid level detector of claim 1 further including a printer for printing on media wherein the fluid container contains ink with the fluid level detector providing a signal to the printer identifying a low ink condition.

9. The fluid level detector of claim 1 wherein the light intensity is based on the light path length and optical properties of the fluid.

10. A fluid level detector for providing a fluid level output signal indicative of fluid level, the fluid level detector comprising:

a light providing conduit for providing light along a light path;

a light receiving conduit for receiving light along the light path provided by the light providing conduit; and wherein the light path extending from the light providing conduit to the light receiving conduit extends through fluid, the light path having a first light path length and a corresponding first optical density associated with a first fluid level and a second light path length and a corresponding second optical density associated with a second fluid level with the first optical density being different from the second optical density and wherein the light receiving conduit provides a signal indicative of the first and second optical density which is thereby indicative of the first and second ink levels, respectively.

11. The fluid level detector of claim 10 wherein the light providing conduit and the light receiving conduit are fiber optic conduit.

12. The fluid level detector of claim 10 further including a reflective member for receiving light along an incident light path and directing light along a reflected light path, the reflective member being positioned relative to the light providing and light receiving conduits to receive light from the light providing conduit along the incident light path and direct light along reflected light path toward the light receiving conduit.

13. The fluid level detector of claim 10 wherein the optical density is based on the light path length and optical properties of the fluid.

14. A method for detecting fluid level in a fluid container comprising:

providing light to a first end of a light path, the light path having a light path length defined as being along the light path between the first end and a second end of the light path with the light path extending through fluid within the container;

varying the light path length based on an amount of fluid within the container;

detecting light intensity at the second end of the light path with light intensity at the second end being indicative of fluid amount in the container.

15. The method for detecting fluid level of claim 14 wherein light intensity at the second end is based on the light path length and optical properties of the fluid.

16. A fluid level detector for providing a signal indicative of fluid level in a flexible fluid container, the fluid level detector comprising:

a first light conduit portion for providing light to fluid within the fluid container and a second light conduit portion for receiving light provided by a light source;

a base member; and first and second paddle members linked to the first and second light conduit portions, the first and second paddle members being movably attached to the base member, the first and second paddle members having a first position biased outwardly in opposition associated with a container fill condition and a second position compressed inwardly toward each other associated with a fluid container low condition wherein a light path length between the first and second light conduit portions through container fluid is a first length associated with the first position and a second length, different from the first length associated, with the second position.

17. The fluid level detector of claim 16 wherein the flexible container having a container shape that varies with the amount of fluid within the container with changes in the container shape producing changes in the light path length.

18. The fluid level detector of claim 16 further including a reflective member for receiving light along an incident light path and directing light along a reflected light path, the reflective member disposed relative to the first and second conduit portions to receive light from the first conduit portion along the incident light path and direct light along reflected light path toward the second conduit portion.

19. The fluid level detector of claim 18 wherein the reflective member is positioned within fluid, the reflective member having a first position whereby light detected by the light detector is above a threshold level and a second position whereby light detected by the light detector is below a threshold with the first position being associated with a fluid normal condition and the second position being associated with a fluid low condition.

20. The fluid level detector of claim 18 further including a flexible container for containing fluid, the flexible container having a shape that varies with fluid level within the flexible container and with the reflective member being linked to the flexible container producing changes in the light path length with changes in the flexible container shape.

21. The fluid level detector of claim 16 wherein one of the first and second light conduit portions are a fiber optic conduit.

22. The fluid level detector of claim 16 further including a light source for providing light to the first light conduit portion and a light detector for detecting light intensity received by the second light conduit portion.

23. The fluid level detector of claim 16 further including a printer for printing on media wherein the fluid container contains ink with the fluid level detector providing a signal to the printer identifying a low ink condition.

* * * * *